United States Patent [19]

Zorloni

[11] Patent Number: 4,877,428

[45] Date of Patent: Oct. 31, 1989

[54] IONIC AIR CLEANER FOR HOMES AND MOTOR VEHICLES

[76] Inventor: Riccardo Zorloni, Via Trento Trieste, 78 - 20030 Baruccana di Seveso, Milano, Italy

[21] Appl. No.: 281,251

[22] Filed: Dec. 7, 1988

[30] Foreign Application Priority Data

Dec. 17, 1987 [IT] Italy ............................... 23066 A/87

[51] Int. Cl.[4] .............................................. B03C 3/02
[52] U.S. Cl. ........................................ 55/139; 55/152; 55/154
[58] Field of Search .................................. 55/150–152, 55/154, 139

[56] References Cited

U.S. PATENT DOCUMENTS

3,157,479  11/1964  Boles ..................................... 55/152

FOREIGN PATENT DOCUMENTS

0129401  12/1984  European Pat. Off. .............. 55/154

Primary Examiner—Bernard Nozick
Attorney, Agent, or Firm—Bucknam and Archer

[57] ABSTRACT

The cleaner comprises a substantially cylindrical box-like housing enclosing a high static voltage generator, having at least an input and at least two outputs, one of the outputs being electrically coupled to at least an ionizing point assembly and the other output being coupled to at least a predetermined zone of the housing, the cleaner further comprising a removable conductive metallized film adapted to pick up the powder particles entrained in the environment air.

12 Claims, 3 Drawing Sheets

IONIC AIR CLEANER FOR HOMES AND MOTOR VEHICLES

BACKGROUND OF THE INVENTION

The present invention relates to an ionic cleaner particularly designed for cleaning environment air in homes and/or motor vehicles.

As is known, subjective comfort sensations are affected by the amount of negative or positive ions which are present in the environment.

In this connection, it should be pointed out that powerful negative ion natural sources consist of conifers and waterfalls which provide refreshing sensations.

Based on this discovery, several negative ion generating devices have been designed which, at the start, have been used in laboratories and specialized clinics.

Domestic negative ion generating devices have been also devised for cleaning home and office air, and these domestic devices have been specifically improved in order to reduce the air particle contents.

In fact, as is known, industrial zone air is frequently polluted by motor vehicle discharge gases, furnace stack gases and the like, this air practically containing a large amount of noxius polluting particles such as carbon powders, lead powders and the like.

Another problem is that of the so-called "passive fume", that is the fume which is inhaled by no smoking persons, because of the presence of smoking persons.

Known ionizing devices substantially consist of apparatus able of generating a lot of negative ions.

Commercially available ionic cleaner devices, however, have some drawbacks and, in particular, they have a rather high cost and a low operating efficiency; moreover, their maintenance requires skilled labour.

SUMMARY OF THE INVENTION

The main object of the present invention is to provide such an environment ionic cleaner device which, in addition to being very compact, and very efficient in generating ionic particles, is moreover adapted to be easily used both in a domestic environment, such as a home room, and, in particular, on a motor vehicle.

Another object of the present invention is to provide such an ionic cleaner device which is very simple construction-wise, does not require maintenance and can be easily assembled and installed, so as to generate a great amount of negative ions able to continuously refresh environment air, with a very reduced power consume.

Another object of the present invention is to provide such an ionic cleaner device which can be supplied by conventional electric power sources such as those available in homes and motor-vehicles and which, moreover, has a very reduced making cost.

Yet another object of the present invention is to provide such an environment ionic cleaner device which comprises electrostatic means for recovering air-entrained polluting particles.

According to one aspect of the present invention, the above mentioned objects, as well as yet other objects, which will become more apparent hereinafter, are achieved by an ionic air cleaner device, comprising a metallized plastics material film roll, the film of which can be torn away by the user so as to collect, periodically, dust particles picked up by said metallized plastics material.

Such a result is obtained by means of the mentioned film roll or "coil" which operates as a dust collector, since said coil is positively charged thereby causing electrically charged particles to deposit by electrostatic attraction.

In fact, the subject device generates a high electrostatic field, adapted to convey negative charges on tip or point members so as to scatter them in the environment.

As mentioned, these negative charges are electrostatically attracted by the mentioned dust collector member.

It should be pointed out that this is the main feature of the present invention which provides the device according to the invention with the possibility of perfectly cleaning environment air at a low power consume and, accordingly, at a very low cost.

The constructional features of the mentioned collector member are very advantageous since the collector member is made of a metallized plastics material adapted to be torn away by portions, which is able of generating a high electromagnetic field for picking up dust particles and the like, and which, moreover, can be easily removed without the need of using skilled labour.

Another advantageous feature of the invention is that the cleaner device does not include any expensive cleaning filters which require periodic maintenance or replacement.

BRIEF DESCRIPTION OF THE DRAWINGS

Further characteristics and advantages of the ionic cleaner device according to the invention, will become more apparent hereinafter from the following detailed description of two preferred embodiments thereof, which are illustrated, by way of an indicative but not limitative example, in the accompanying drawings, where.

DESCRIPTION OF THE PREFERRED EMBODIMENTS

Figure 1:
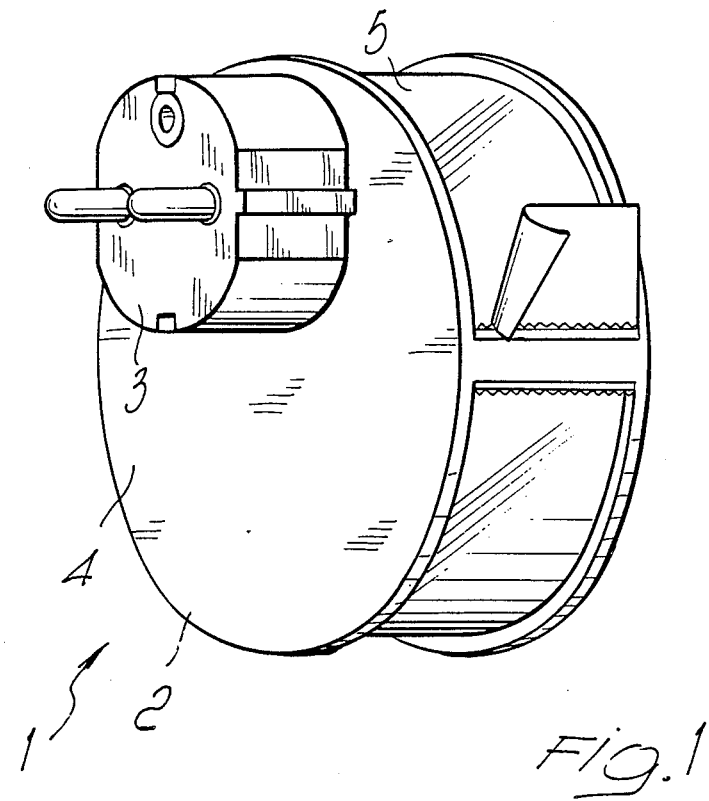
FIG. 1 is a partial schematic perspective view of a first embodiment of the ionic cleaner device according to the invention.
Figure 2:
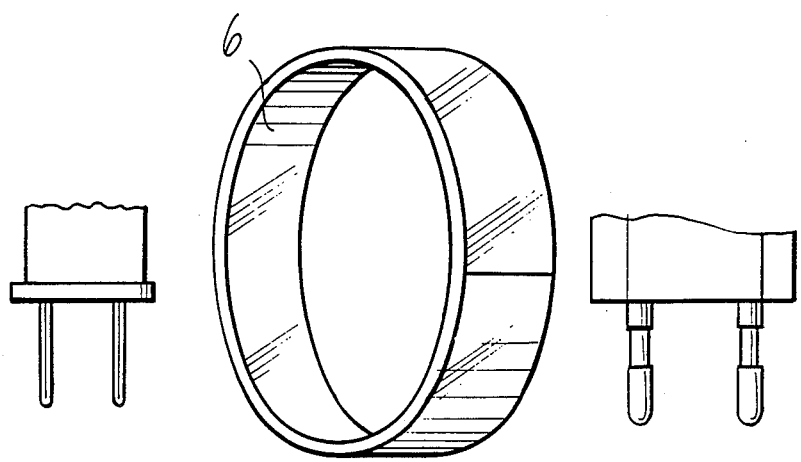
FIG. 2 illustrates operating elements included in the ionic cleaner device shown in FIG. 1.

With reference to the Figures of the accompanying drawings and, more specifically to FIGS. 1 and 2, the environment ionic cleaner device according to the invention has been herein indicated at the overall reference number 1.

In particular, this device which, in FIG. 1, is shown by a bottom perspective view, comprises a box-like housing 2, therewith there is directely associated a plug 3, for example a plug of the wall type, to be engaged in a corresponding socket of the type commonly available in homes.

The box-like body 2, of substantially cylindrical shape, has a bottom 4 and a side wall 5.

The bottom 4 is made of a plastics material, whereas the side walls 5 consist of a metallized plastics material film and are coupled to a positive polarity in order to cause the ions generated by the device to be discharged as it will become more apparent hereinafter.

More specifically, the side wall 5 consists of a conductive strip, or of a conductive ring member 6, which is shown in a more detailed way in FIG. 2.

In this Figure there are also shown two types of plugs which can be associated with the subject device.

Inside the box-like housing 2 of the device there is arranged a negative and positive high voltage generating circuit which, according to an advantageous feature of the invention, substantially consists of a double generator or source, which will be disclosed in a more detailed way hereinafter.

Figure 3:
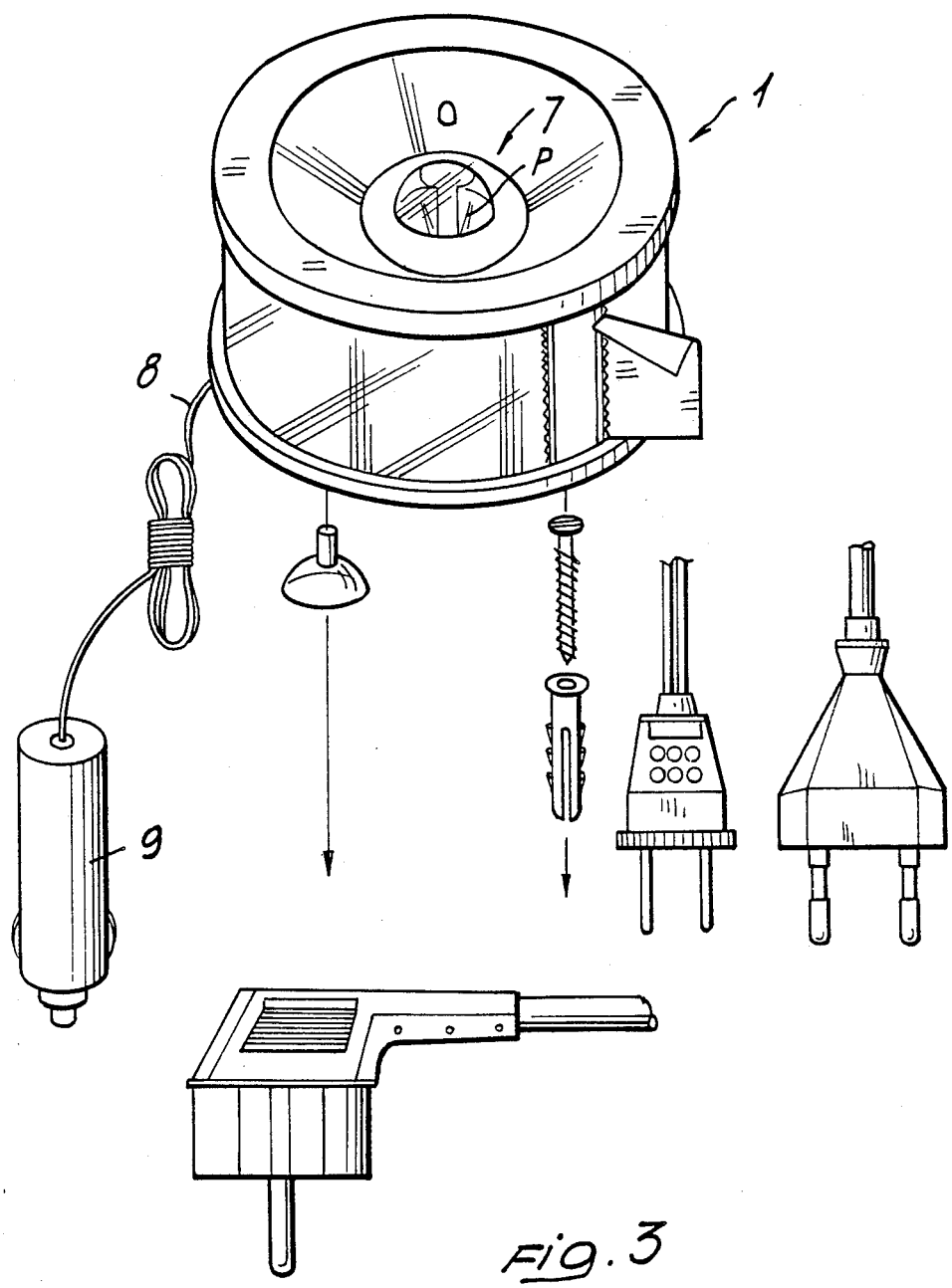
FIG. 3 is a further perspective view illustrating a second preferred embodiment of the subject ionic cleaner device, provided with several types of plugs to be used for specific applications.

This circuit has an output thereof, that is the negative output, coupled to at least a point assembly for generating ions, which point assembly is indicated at the reference number 7 in FIG. 3, and comprises at least a point member P which, as is shown, is arranged at the paraboloid shaped top face of the housing 2.

In the embodiment shown in FIG. 3, the subject device further comprises a power supply cord 8, one end of which is coupled to a conventional plug 9 adapted to be supplied with either 12 V or 24 V dc power by the leighter installed on board of a motor vehicle. This plug can be replaced by conventional AC mains plugs.

FIG. 3 also shows conventional means for affixing the cleaner device according to the invention at a suitable zone of a motor vehicle of a room.

Figure 4:
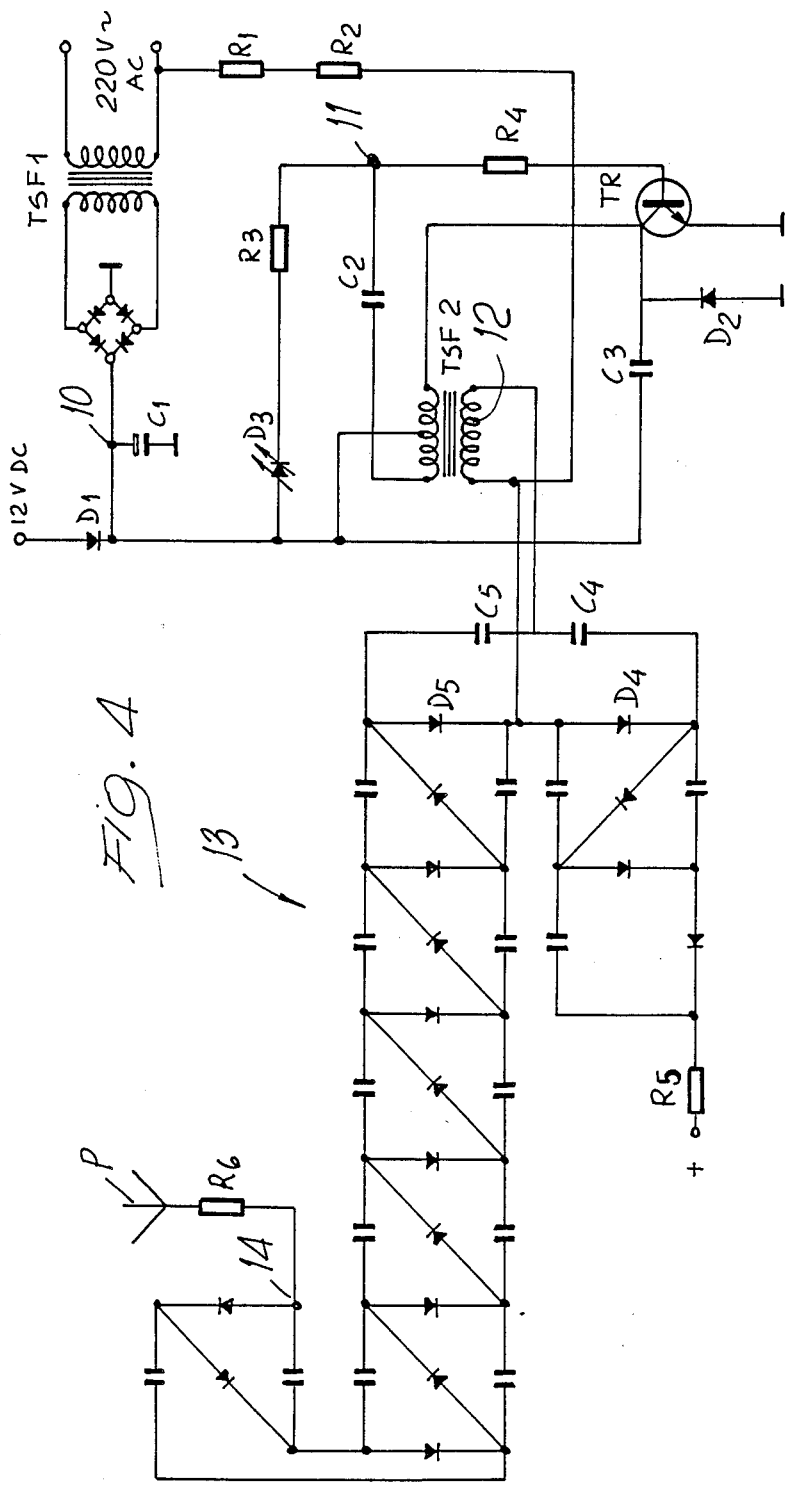
FIG. 4 shows a schematic circuit diagram of a double generator adapted to generate a high ionizing static voltage, included in the subject ionic cleaner device.

With reference to FIG. 4, a circuit diagram is herein shown of a high static voltage double generator adapted to provide both a negative and a positive ionizing high voltage, which generator forms another important feature of the invention.

As is shown, this circuit comprises, substantially, a transformer TSF 1, the primary winding of which is adapted to be coupled to the 220 VAC mains, as conventionally available in a home.

The secondary winding of the transformer TSF 1 power supplies a diode bridge the output of which is filtered through the capacitor C 1, which has one end coupled to ground and the other end thereof, or top end 10, coupled, in addition to the mentioned output of the diode bridge, to the cathode of a diode D 1, the anode of which is coupled to the (+) terminal of a 12 V dc power supply which, as stated, can be a conventional battery of a motor vehicle.

The cathode of the diode D 1 is moreover coupled, through a photodiode D 3 and two resistors R 3 and R 4, to the base electrode of a transistor TR, having its emitter electrode coupled to ground.

The collector electrode of the transistor TR is coupled to a winding of a further transformer TSF 2, of the central tap type; the other end of this winding is coupled, through the capacitor C 2, to the common junction point 11 of the resistors R 3 and R 4.

The collector electrode of the transistor TR is also coupled to the ground, through a diode D 2, which is coupled with the shown polarity; this collector electrode, moreover, is coupled, through a further capacitor C 3, to the central tap of the winding of the transformer TSF 2, to the anode of the photodiode D 3 and the cathode of the diode D 1.

The other winding, indicated at 12, of the transformer TSF 3 is coupled to a voltage multiplier assembly overally indicated at the reference number 13; this assembly comprises, in a known way, a cell cascade, consisting of respective diodes and capacitors, each cell operating as a voltage doubling unit.

The positive output of the voltage multiplying assembly 13 is taken through the resistor R 5, whereas the negative output, indicated at 14, is taken through the resistor R 6 and sent to the ionizing point P, which will generate ions based on the corona effect which is per se well known.

As stated, the (+) output will be coupled to the metal bottom 6 or the metallized film 5 held in the housing or casing of the cleaner device and will be also coupled to the side wall also made of a metal material: thus, the ions generated by the point P will be discharged on the positive voltage parts of the device, thereby efficiently cleaning air.

In particular, negative ions, generated by one or more points P will saturate environment air by moving with a high speed therethrough; as these negative ions encounter particles, said ions will adhere to the particles thereby negatively charging them and causing said particles to precipitate towards the positive electrical field formed by the bottom and the wall collector sheet of the casing or the device.

Thus, environment air will be perfectly cleaned.

Each new particle entering the action field of the device will be picked up by the collector 5 and removed from environment air.

In this connection it should be apparent that the ionic cleaner device according to the invention must be continuously held in an on condition since the average life of negative ions is very short and, because of this reasons, these negative ions must be continuously renewed.

From a prototype it has been found that, notwithstanding the provision of the double high static voltage generator, the electric power consume of the device is very small, of about 1 W for each device, this value being much less than the consume of known similar devices.

A single ionizing unit, from carried out test, has been found to be able of cleaning an air volume of about 5.17 $m^3$.

For greater volumes, several units can be provided.

From the above disclosure it should be apparent that the invention fully achieves the intended objects.

While the invention has been disclosed with reference to preferred embodiments thereof, it should be apparent that the disclosed embodiments are susceptible to several modifications and variations all of which will come within the spirit and scope of the invention as defined in the accompanying claims.

I claim:

1. An environment ionic cleaner device, particularly designed for domestic and/or motor vehicle use, of the type in which ions are generated by means of a high electrostatic voltage, comprising a box housing, of substantially cylindrical shape, enclosing a double high static voltage generator, having at least an input and at least two outputs, one of said outputs being electrically coupled to at least an ionizing point assembly and the other output being coupled to at least a preset zone of said housing thereat there is applied a metallized plastics material film roll, and further including film cutting means for removing portions of said film.

2. An ionic cleaner device according to claim 1, wherein said double generator comprises a solid state switching member transistor, which is so coupled as to operate as a voltage converter/step up member.

3. An ionic cleaner device according to the claim 1, wherein said high static voltage double generator has two inputs, one input being provided for coupling to the AV 220 V mains, the other input being provided for coupling to a set power supply zone of the electric system of a motor vehicle.

4. An ionic cleaner device according to claim 3, wherein said set zone of said electric system of said motor vehicle consists of an electric lighter.

5. An ionic cleaner device according to claim 1, wherein said double generator comprises a voltage multiplier circuit of the diode and capacitor type.

6. An ionic cleaner device according to claim 5, wherein said voltage multiplier circuit has two outputs, that is a negative and a positive output, the negative output being electrically coupled to point means for generating ions, the positive output being electrically coupled to said set zone of said housing.

7. An ionic cleaner device according to claim 1, wherein said set zone thereto there is coupled the positive output of said voltage multiplier circuit consists of the side wall of said housing.

8. An ionic cleaner device according to claim 7, wherein said set zone consists of the bottom of said housing.

9. An ionic cleaner device according to claim 1, wherein said set zone consists both of the bottom and of the side wall of said housing.

10. An ionic cleaner device according to claim 9, wherein said side wall of said housing consists of a removable metallized plastics film coil, comprising a supporting board thereon there is wound a metallized film.

11. An ionic cleaner device according to claim 1, comprising an electrical plug directly coupled to said housing.

12. An ionic cleaner device according to claim 11, wherein said plug is an AC or an dc plug.

* * * * *